Figure 1:
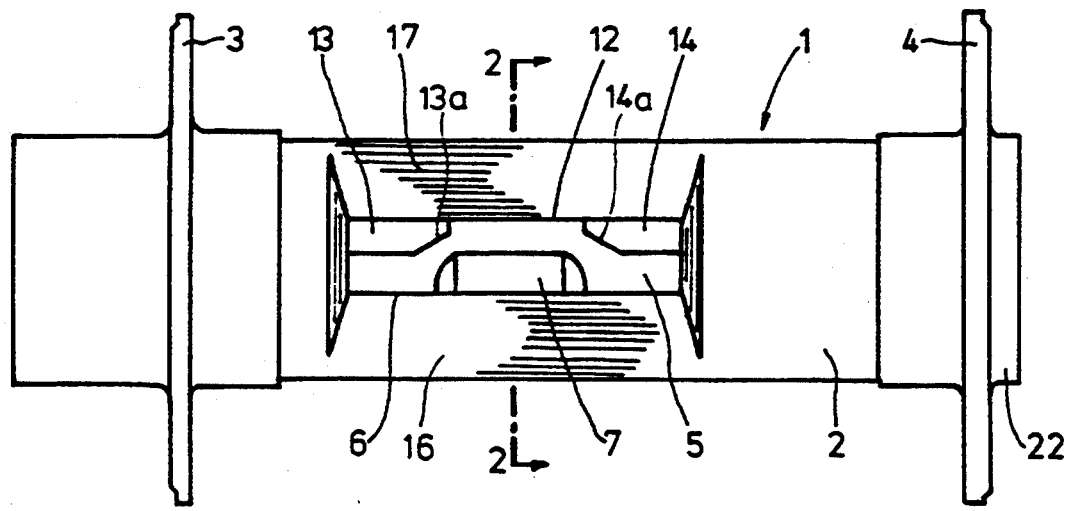

United States Patent [19]

Barth et al.

[11] Patent Number: 5,419,507
[45] Date of Patent: May 30, 1995

[54] REEL FOR STRIP-LIKE RECORDING SUBSTRATES, IN PARTICULAR FOR PHOTOGRAPHIC FILMS

[75] Inventors: Josef Barth, Herrngiersdorf; Erwin Brunner, Rohr, both of Germany

[73] Assignee: AGFA-Gevaert Aktiengesellschaft, Leverkusen, Germany

[21] Appl. No.: 109,145

[22] Filed: Aug. 19, 1993

Related U.S. Application Data

[63] Continuation of Ser. No. 725,580, Jul. 3, 1991, abandoned.

[30] Foreign Application Priority Data

Jul. 17, 1990 [DE] Germany .................. 40 22 666.2

[51] Int. Cl.⁶ ................ B65H 75/28; G03B 17/26
[52] U.S. Cl. .................. 242/348.1; 242/587.1
[58] Field of Search ............... 242/71, 71.8, 71.9, 242/74, 68.5, 348, 348.1, 587.1

[56] References Cited

U.S. PATENT DOCUMENTS

| | | | |
|---|---|---|---|
| 3,361,380 | 1/1968 | Mizutani | 242/74 |
| 3,481,552 | 12/1969 | Gersch et al. | 242/71.1 |
| 4,220,292 | 9/1980 | Mizutani et al. | 242/71.8 |
| 4,506,843 | 3/1985 | Lührig et al. | 242/74 |
| 4,834,310 | 5/1989 | Ikariya et al. | 242/74 |
| 4,852,821 | 8/1989 | Harris et al. | 242/71.8 |
| 4,978,084 | 12/1990 | Harris et al. | 242/74 |
| 4,984,751 | 1/1991 | Hoffacker et al. | 242/74 |

FOREIGN PATENT DOCUMENTS

| | | | |
|---|---|---|---|
| 294794 | 5/1968 | Australia | 242/74 |
| 768612 | 2/1957 | United Kingdom | 242/74 |
| 834693 | 5/1960 | United Kingdom | 242/74 |

*Primary Examiner*—Daniel P. Stodola
*Assistant Examiner*—John P. Darling
*Attorney, Agent, or Firm*—Connolly & Hutz

[57] ABSTRACT

A reel for strip-like recording substrates, in particular photographic films, with a slot provided in the reel core and at least one hook provided therein for fixing the end of the tape inserted into the slot, wherein the upper and lower side of the hook are joined together by an oblique face at the end opposite the film insertion side, in such a manner that the hook tapers towards the hook end and the hook surface is longer than the hook under-side, and wherein any chosen sections parallel to the under-side of the hook through the oblique face produce arcuate lines of intersection, ensuring secure insertion of the film end.

2 Claims, 4 Drawing Sheets

REEL FOR STRIP-LIKE RECORDING SUBSTRATES, IN PARTICULAR FOR PHOTOGRAPHIC FILMS

This application is a continuation of application Ser. No. 07/725,580 filed on Jul. 3, 1991, now abandoned.

The invention relates to a reel for strip-like recording substrates, in particular for photographic films, with a slot provided in the reel core and at least one hook provided therein for fixing the end of the tape inserted into the slot, wherein the end of the strip has a hole, which is so placed at the end of the strip that its position, upon insertion into the reel slot, covers the position of the hook and the hook can engage in the hole after insertion of the end of the strip.

Such reels are known and have frequently been improved. A reel formerly used is described in EP-A 186 824, for example. In the case of the hook provided in this reel, the upper and lower side of the hook are joined together by an oblique face on the end opposite the film insertion side, in such a manner that the hook tapers towards the hook end and the hook surface is longer than the under-side of the hook. The strip end is inserted over the upper side, and the edge of the hole in the film slides over the under-side joining the foot of the hook when retracted, in order finally to be held by the foot of the hook. The region between the hook under- side and reel core, closed on one side by the foot of the hook and open on the opposite side, is also referred to as a hook gap.

In order to simplify sliding of the strip end into the hook gap, the hook end is rounded, viewed in plan, this rounding-off corresponding approximately to the radius of the film strip hole.

Insertion and retraction of the strip end is carried out in modern high-power machines at such a high speed that, in conventional reels, a certain proportion of strip ends do not slide into the hook gap when retracted quickly, but remain hanging on slope of the hook end, and therefore project from the slot at the rear of the reel core.

This defect causes deformation of the wound-on film, which causes the formation of a haze on the film. It is disadvantageous in this case, because the incomplete pulling of the strip end into the reel core is not noticed on the finished strip and therefore the faulty piece cannot be rejected.

The object of the invention was to overcome this fault without causing other faults.

The object is solved surprisingly in that the slope is such that any chosen sections parallel to the under-side of the hook through the oblique face produce arcuate lines of intersection. Preferably, the lines of intersection are arcs of a circle whose radius is equal to the radius of the fixing hole in the strip end.

Figure 2:
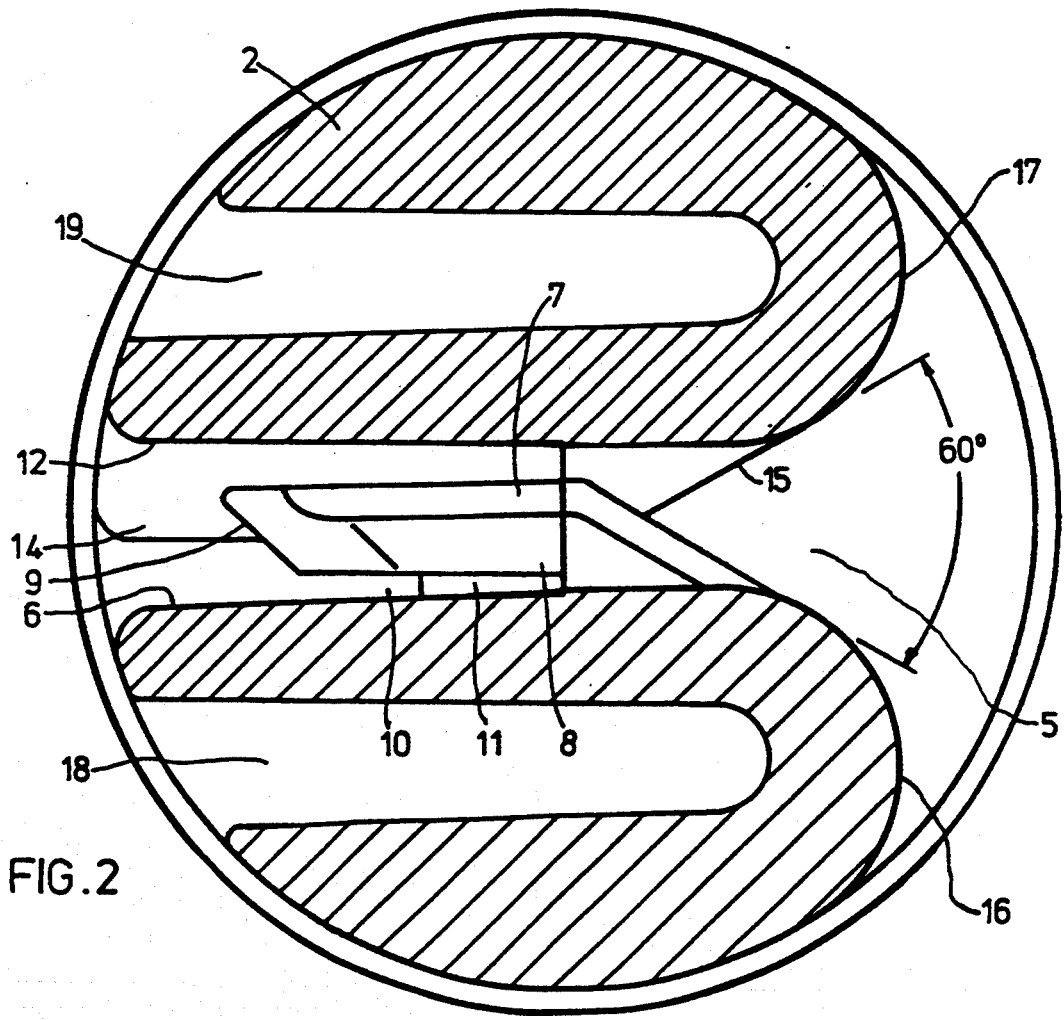
Figure 3:
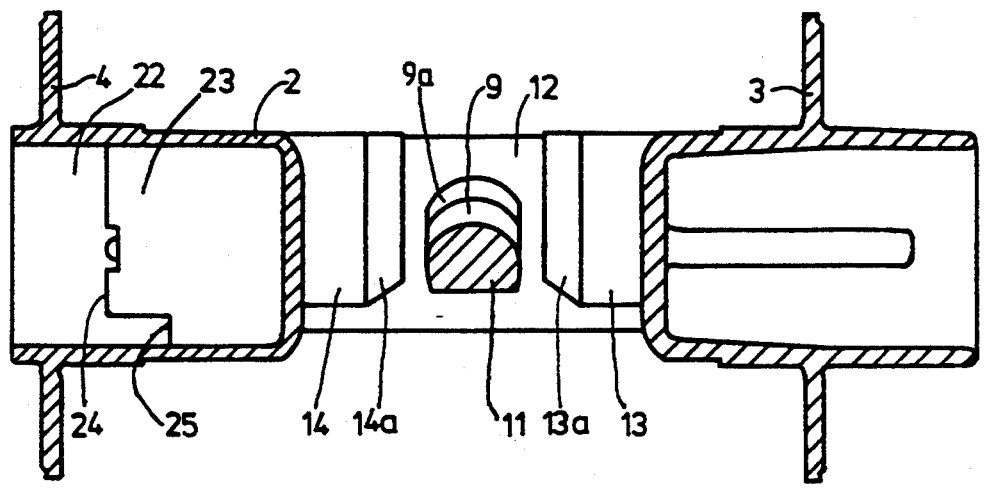
Figure 4:
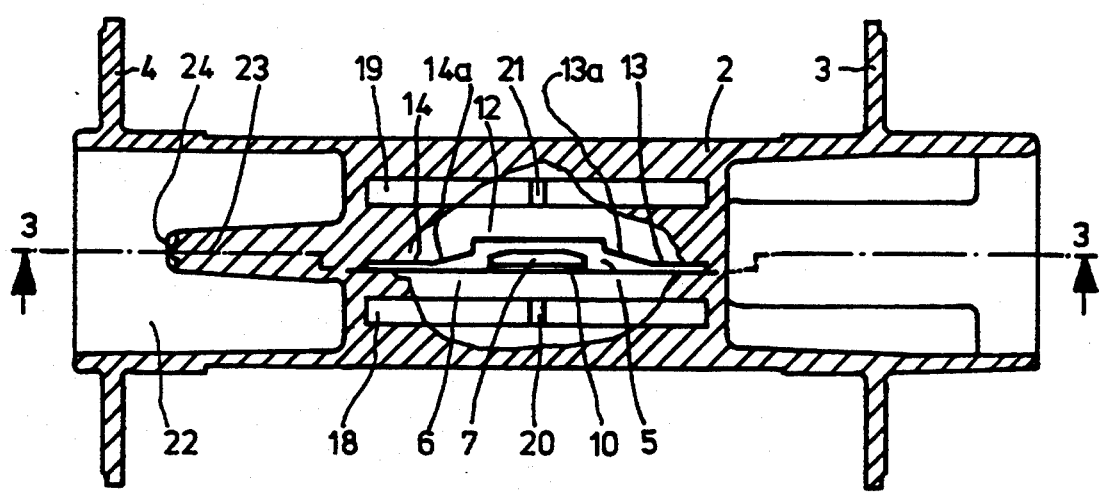
Figure 5:
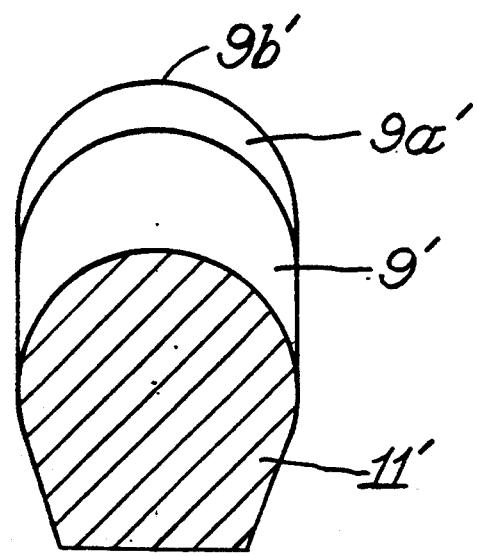
Figure 5A:
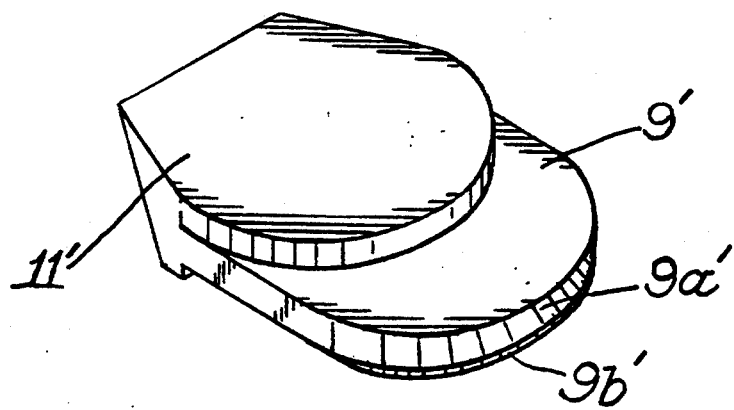

FIG. 1 shows a film reel in elevation, with a view of the film insertion side,

FIG. 2, the subject of FIG. 1 in cross-section along the line 2—2 (without flanges) according to the invention, FIG. 3, the same film reel in longitudinal section along the line 3—3 of FIG. 4, according to the invention, FIG. 4, the subject of FIG. 1, partly in section, partly in elevation, with a view of the side opposite the film insertion side, according to the invention, FIG. 5, an elevation view of a hook under-side of a prior art film reel hook, FIG. 5A is a perspective view of the hook shown in FIG. 5.

Figure 6:
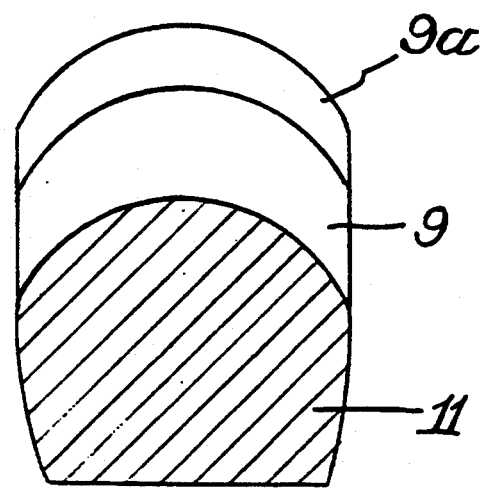

FIG. 6, an elevation view of a hook under-side according to the invention.

Figure 6A:
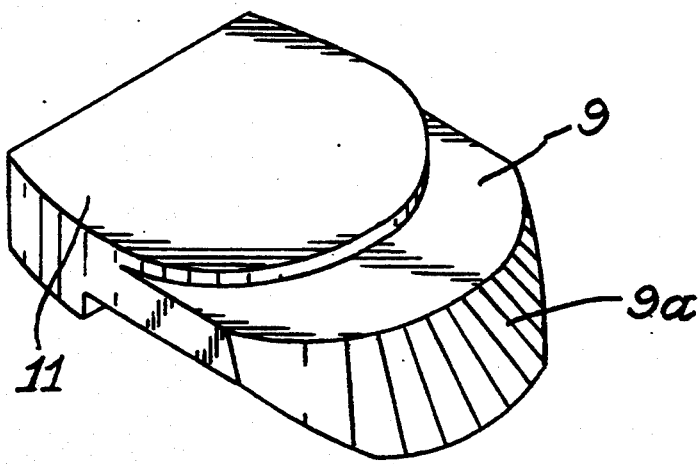

FIG. 6A is a perspective view of the hook in accordance with the invention shown in FIG. 6.

The film reel 1, composed of injection-moulded plastics, has a substantially cylindrically formed reel core 2 with two lateral flanges 3 and 4.

In the reel core 2 is a slot 5, which extends axially through the core centre and which is intended for the insertion and fixing of the end piece of a photographic roll film, e.g. of a 35-mm film, which is wound on to the film reel after fixing, to which end the film end in FIG. 2 is inserted from the right-hand side into the reel slot 5 and, after fixing of the film in this slot, the film reel 1 in the diagram in FIG. 2 is rotated in an anti-clockwise direction.

The film hook 7 for fixing the film, having a hook shank 8 and a hook head 9, is moulded to the lower wall 6 of the reel slot 5. The hook shank 8 has a ramp on the side on which the film is inserted, on which the film end to be inserted can slide during the insertion movement, until it falls over the hook 7 with a fixing hole suitably formed as an elongate hole, and after slight retraction of the film, hooks in the hook gap 10 between the hook head 9 and the slot wall 6. The hook foot 11 conforms, in a known manner, to the shape of the elongate hole of the film, so that the edges of the film can lie flush against the hook foot 11 in the elongate hole.

Two holding-down elements 13, 14 are moulded to the upper wall 12 0f the slot 5 and also have ramps 15 on the side where the film is inserted, these ramps sloping towards the upper side of the hook 7 (faces 13a, 14a). The holding-down elements 13, 14 have the effect that the lateral edges of the film end are curved downwards when inserted into the slot 5, if the film end is pressed upwards in the longitudinal axis of the film when sliding over the ramp of the film hook 7. As soon as the elongate hole of the film falls into the hooks 7, the film becomes flat again due to its inherent rigidity. The holding-down elements 13, 14 then prevent the elongate hole of the film from being able to lift back out of the locking hook 7.

The ramp on the hook 7 and the ramps 15 on the holding-down elements 13, 14 permit easy insertion of the film end into the slot 5, without the film being upset thereby. To this end, the above-mentioned ramps are relatively flat. They include an angle of approx. 60° which is approximately symmetrical to the reel centre plane M shown in FIG. 2.

FIG. 2 further shows that the hook gap 10, which is located between the hook head 9 and the slot wall 6 and into which the film hooks, is located below the reel centre plane, i.e. on the side via which winding up takes place in manufacture. The clear width of the recess 10 is only slightly greater than the film thickness.

Obviously, instead of a single film hook 7, a plurality of adjacent film hooks can be provided, in which case the film end also has a corresponding number of elongate holes.

The walls 6, 12 of the reel slot 5 are joined to joining faces 16, 17, which are in turn joined to the outer faces of the reel core 2. In this case, a fold does not form either in the direction of the slot faces 6, 12 nor in the direction of the cylindrical outer faces of the reel core.

The joining faces 16, 17 extend in the cross-section according to FIG. 2 respectively over an angular region of approx. 135° and form, within this region, surfaces of circular cylinders with a radius which, in the example according to FIG. 2, is approximately 0.38 times as large as the radius of the cylindrical casing surface of the reel core 2.

With this configuration, the joining faces 16, 17 receive the largest possible radius without the risk of more or less sharp bending lines or severe curvatures in the join with the slot faces 6, 12 in the join with the outer contour of the reel core 2. Rather, the curve in the transition from the plane slot walls 6, 12 to the cylindrical outer faces of the reel core 2 is almost constant and as slight as possible.

Thereby, when wound up, the film can abut in a flush manner either the joining face 16 or the joining face 17, according to the direction of rotation of the reel, and only assumes the minimum curvature, as is determined by the curvature of the joining face 16 and 17 respectively. Preferably, winding up should be effected over the joining face 16. Even if the film assumes this curvature irreversibly when stored for a relatively long time in the wound-on state, it is not so great that, during mechanical unwinding with the jerky stopping of the film, its tensile strength is over-stressed. Furthermore, in this process, due to the arrangement of the hook 7 with its hook gap 10 below the reel centre plane, at the end of unwinding and under the effect of the film tension, the film reel reaches an angular position, such that the film abuts the joining face 16 acting as a shoulder in a flush manner.

The hook gap 10 is formed between under-side or lower side 26 of the hook 7 and the slot wall 6.

As FIGS. 2 and 4 show, in order to save material and for reasons of injection moulding technology, between the reel slot 5 and the outer faces of the reel core 2, the film reel 1 has further slots 18, 19, whose aperture lies on the outside opposite the film insertion side. The slots 18, 19 also extend parallel to the centre axis of the film reel and are divided in the middle by transverse webs 20, 21. These transverse webs prevent side flanges 3 and 4 respectively of a reel from hooking into the slots 18 and 19 respectively of other reels during storage and transport of the empty film reels as loose bulk goods before manufacture.

On the side of the reel flange 4, the reel core 2 is continued in a hub part 22, in which a driver web 23 is mounted. This web can be grasped in order to drive the-reel in the camera or in processing apparatus of film reel keys on the camera or apparatus, whereby the drive movement is transmitted from the camera or manufacturing or processing machine to the film reel.

In order that the camera or machine drive key can be easily disengaged again from the driver web 23, the latter is trapezoidal in longitudinal section, as can be seen from FIG. 4.

In order to identify the angular positioning of the reel, the free edge 24 of the driver web 23 has a recess 25, which is located on one end of the web. By this eccentric location, which is asymmetric relative to the reel axis, with a correspondingly asymmetric drive key, by locating the identifying recess, a correct angular positioning of the film reel in the manufacturing machine can be achieved. This is necessary, for example, in order to place the insertion-side slot aperture exactly opposite the film transporting channel of the manufacturing machine in the case of mechanical insertion of the film end into the reel slot 5 of the film reel 1.

In FIGS. 5, 5A, 6, and 6A, the hook foot 11, the hook head 9 and the oblique or slanting surface 9a can be seen, which is so formed according to the invention (FIG. 6) that any chosen section intersecting the oblique surface 9a in a direction parallel to the lower-side 26 of the hook, the slanting surface of which is penetrated thereby, produce arcuate lines of intersection. The slope preferably has an angle of 30° to 60° relative to the hook under-side.

We claim:

1. In a reel for strip-like recording substrates comprising a reel core, a slot provided in the reel core and at least one hook provided in the slot for fixing the end of the strip-like recording substrate inserted into the slot from a film insertion side, said hook comprising a hook foot which is connected with an inner wall of the slot, a hook head having a lower side which forms with the inner wall of the slot a hook gap, and an upper side over which the strip-like recording substrate is inserted into the slot, the improvement comprising said upper and lower side of the hook being arcuate and being joined together by a surface which is continuous and oblique on the end of the hook opposite the film insertion side in such a manner that the hook continuously tapers between the arcuate surfaces toward the end and the upper side is longer than the lower side of the hook.

2. Reel according to claim 1, characterised in that the slope of the oblique surface relative to the hook under-side is 30° to 60°.

* * * * *